United States Patent [19]

Wilhelmi

[11] 4,078,673

[45] Mar. 14, 1978

[54] ANTI-SLIP DEVICE FOR THE TRANSPORT OR THE STORAGE OF PARCELS

[75] Inventor: Jürgen Wilhelmi, Wachendorf, Germany

[73] Assignee: Bulldog Beratungs-und Vertriebsgellschaft m.b.H., Bremen, Germany

[21] Appl. No.: 774,124

[22] Filed: Mar. 3, 1977

[51] Int. Cl.² .............................................. B65G 1/14
[52] U.S. Cl. ................................ 214/10.5 R; 105/463; 206/386
[58] Field of Search .............. 214/10.5 R; 105/366 R, 105/366 E, 463, 475, 483, 486, 373, 489; 206/303, 471, 386

[56] References Cited

U.S. PATENT DOCUMENTS

| 1,638,612 | 8/1927 | Baus | 214/10.5 R X |
| 1,953,303 | 4/1934 | Kohlmann | 214/10.5 R X |
| 2,950,004 | 8/1960 | Acomb | 206/471 X |
| 3,178,019 | 4/1965 | Fetzek | 206/471 X |
| 3,369,676 | 2/1968 | Swetnam | 214/10.5 R |

*Primary Examiner*—Frank E. Werner

[57] ABSTRACT

Anti-slip device for the transportation or storage of parcels packed on wood or consisting of wood, such as cases or beams or the like, which are surrounded by at least one strap, comprising a rectangular metal securing plate provided in the longitudinal marginal area of its top and bottom with fastening teeth projecting substantially vertically from the plane of the plate. The narrow transverse marginal areas of the plate are without teeth and are of a width at least equal to the width of the strap. The plate is fastened to an end section of a strap-like holder of flexible material by means of a covering plastic film. The holder has a length substantially greater than that of the plate for the formation of a handle.

6 Claims, 4 Drawing Figures ial plant
ANTI-SLIP DEVICE FOR THE TRANSPORT OR THE STORAGE OF PARCELS

BACKGROUND OF THE INVENTION

The invention relates to an anti-slip device for the transport or the storage of parcels packed in or on wood or consisting of wood, such as for example wood packing cases or lumber or the like, which are tied with at least one strap.

Both in the case of transport within an industrial plant and in the case of transport outside of industrial plants, on trucks, cars, ships or the like, it is necessary to secure parcels reliably against slipping.

Protection against slippage to increase stackability is generally necessary whenever parcels have to be stacked one on the other in several layers. Unless such protection is provided, the stacks cannot be made very high. This is disadvantageous wherever it is generally desirable to stack goods to the greatest possible height for the optimum utilization of available floor space.

As an anti-slip device for goods packed in wood, such as wood cases or the like, or for goods packed on wood such as pallets, coil frames or the like, and for the prevention of the slippage of parcels consisting of wood such as lumber, logs or the like, a circular safety disk has been proposed which is provided with tooth-like projections around its margin, these fastening teeth projecting vertically upward from the upper side and vertically downward from the bottom side.

It has been found, however, that an anti-slip device of this kind does not satisfy requirements when the material to be secured against slippage is tied together with straps consisting generally of steel, i.e., flat bands of metal or plastic made endless in some suitable manner. However, this is frequently the case with parcels stacked on wood pallets and held in place thereon by strapping. Packing cases or the like are also frequency provided with metal strapping which is wrapped tightly about the parcels for the purpose of providing them with greater security in transport.

One important disadvantage of the above-mentioned, previously known anti-slip device consists in the fact that it cannot be properly placed in the area of the strap, since the fastening teeth are bent over when the parcel of material is lowered onto another parcel or onto a surface consisting of wood strapped with metal bands. If the strapping consists of plastic, it can be damaged by the teeth. The bending of the teeth in the area of the strapping will result in failure to achieve the desired intimate fastening between the wood pieces to be held together, since the teeth which are not in the area of the strapping will be unable, on account of the bent teeth, to penetrate as far into the wood as is desirable for secure fastening.

At the same time it must be considered that the strapping, precisely in the case of wooden packing cases or the like, is located in the area of the bearing surfaces, so that the anti-slip devices have to be placed there, not at other, more elevated locations.

Another disadvantage is that, when a truck, for example, is being loaded with a heavy packing case, it is extremely dangerous to insert the known disks by hand between the case and the platform or floor of the truck, since in this case the hands of the personnel come between the case and the floor or another case, so that when the material is lowered by a fork lift truck, a crane or the like, relatively severe injuries can be incurred.

An anti-slip device has become known which, in addition to the fastening teeth bent out approximately centrally from the top and bottom of a narrow metal strip, has a prolonged end which is not provided with fastening teeth, so that this known fastening means can be inserted from without between two parcels or between a parcel and a loading surface, without the above-mentioned danger of injury. With this known anti-slip device, however, a plurality of such parcels cannot be disposed closely adjacent one another as is desired as a general rule, since the free ends serving as handles project laterally. This lateral protrusion, however, not only prevents stacking parcels close together but also constitutes a considerable hazard, since this known anti-slip device must necessarily be made of metal. The hazard, however, threatens not only the personnel, but often the adjacent goods as well, when delicate material is involved, such as cardboard boxes or the like which are stacked on a pallet.

THE INVENTION

The invention is addressed to the problem of creating an anti-slip device of the initially described kind, which is suitable especially for parcels packed on wood or consisting of wood and strapped with steel bands or the like, which is to be placed in the area of the strapping. At the same time the anti-slip device is to provide not only for a satisfactory joining together of the wooden surfaces, but is also to assure that several parcels can be stacked without difficulty not only one on the other but also closely beside one another. Lastly, any kind of injury or damage in the handling and setting of the anti-slip devices must be precluded.

The solution of this problem is characterized by a securing plate of metal which is provided in the marginal areas of its top and bottom with fastening teeth projecting substantially vertically from the plane of the plate, a plain edge, without fastening teeth, being provided at least at two opposite marginal portions of the top and bottom, whose width is at least equal to the width of the strapping, and the securing plate being fastened by means of a cover film of plastic onto a terminal section of a strap-like holder of flexible material, whose length is substantially longer than the securing plate for the purpose of forming a handle.

By the omission of the teeth at those marginal sections over which the strapping will extend when the plate is in place, the assurance is obtained that the strap will be able to lie closely against the securing plate without being damaged, much less destroyed, by fastening teeth.

In addition, the handle assures that the anti-slip device can be installed from the outside between two wood surfaces to be joined together, without the need for a person to put his hands between the wood surfaces. At the same time, the projecting section that forms the handle constitutes no obstacle whatever, neither to the close stacking together of parcels nor in the case of a relative movement of the parcels, since the holder consists of a flexible material such as cardboard or the like, so that there can be no injuries to persons or damage to objects by the projecting ends of the strap-like holders.

The invention will be explained with the aid of an embodiment thereof, in conjunction with the appended drawings, wherein FIG. 1 is a perspective view of the anti-slip device of the invention, as seen at an angle from above;

Figure 1:
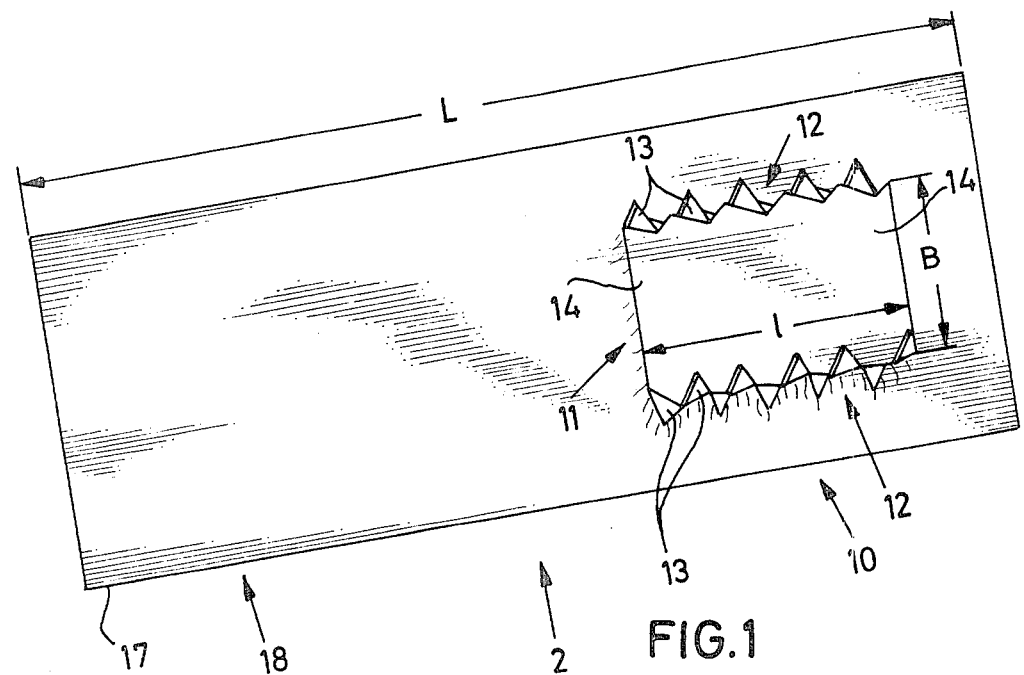
Figure 2:
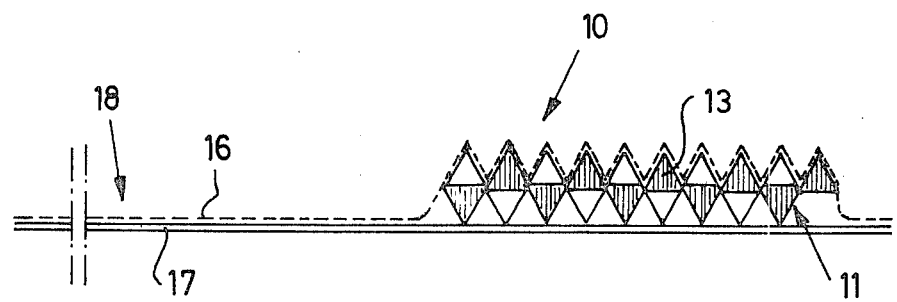
FIG. 2 is a partially diagrammatic representation on a larger scale than FIG. 1 of a side elevational view of the anti-slip device of said FIG. 1, as seen in the direction of arrow 2 thereof.

The FIGS. 1 and 2 of the drawing show an anti-slip device generally designated as 10 for the transport or storage of goods packed on wood or consisting of wood, strapped with bands. FIG. 1 is a perspective view of the anti-slip device as seen at an angle from above, and FIG. 2 is a partially diagrammatic side elevational view of the anti-slip device 10 as seen in the direction of arrow 2 of FIG. 1.

The anti-slip device 10 has a securing plate 11 which consists of steel and is of substantially rectangular construction. At the long edges 12 of the securing plate 11 are fastening teeth 13, whereas the short, transverse edges 14 of the securing plate 11 are plain, i.e., they have no fastening teeth.

As it can be seen in FIG. 1, the fastening teeth 13 are disposed directly on the long edges 12. They are of triangular shape and are bent alternately upward and downward from the principal plane of the securing plate 11.

The width B corresponding to the shorter edges 14 which are not provided with fastening teeth is slightly greater than the width of the strapping that is used.

The securing plate 11 is fastened by means of a plastic film 16, indicated in FIG. 2 by broken lines, to one end portion of a strip-like holder 17 consisting of cardboard, whose length L is, say, thrice as long as the length 1 of the securing plate 11 for the formation of a handle or grip 18.

The cover film 16, made of plastic, is welded onto the holder 17, which is made of cardboard in a bright color, and closely envelops the securing plate 11, as it can be seen in FIG. 2.

Since the fastening teeth 13 are covered over by the plastic film until they are put into use, the danger of injury to the persons working with such anti-slip devices, who might otherwise hurt their hands on the relatively sharp fastening teeth, is eliminated.

Furthermore, the handle 18 provides the assurance that the user will be able to grasp the anti-slip devices 10 by the handle 18 and position them without having to put his hand between a parcel and a loading surface or between two parcels which are to be stacked one on the other.

Another advantage is that the anti-slip device 10, in spite of the relatively long handle 18, is relatively light and, besides, quite inexpensive, since the holder 17— and hence also the handle 18—is made of a relatively thin cardboard.

Making the holder 17 of cardboard additionally offers the considerable advantage that handles 18 protruding beyond the parcel secured with an anti-slip device 10 will not be able to result in injury to workmen or in damage to any objects. Furthermore, this construction assures that the protruding handles 18 will not interfere with the close stacking of parcels, since in this case the handles 18, consisting of cardboard and plastic and protruding laterally, will be bent upwardly and sideways.

Figure 3:
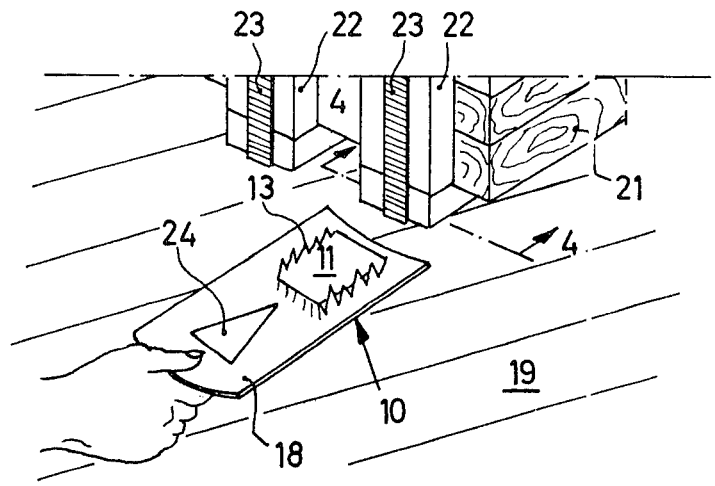
FIG. 3 shows how an anti-slip device of the invention is installed on a wood packing case provided with straps, which is to be secured against slipping.

FIG. 3 shows the state just before the installation of an anti-slip device 10. The wood packing case 21, which in this case is to be secured on a wooden floor 19 of a motor truck, is at a slight distance above the floor 19, being held there by a crane or the like. The case 21 has wooden boards 22 around it, which serve to increase the strength of the case, these boards 22 in turn being reinforced by an endless steel strap 23 fastened around them.

To install the anti-slip device 10, a workman grasps it by the handle 18 and pushes it in the direction of the arrow 24 beneath the bottom wood board 22 of the packing case 21 such that the strap 23 will be approximately centered over the securing plate 11 of the anti-slip device 10.

When this position is reached, with the handle 18 still protruding, of course, and when additional anti-slip devices have been installed, if desired, the packing case 21 is lowered onto the floor 19.

The upwardly projecting fastening teeth 13 will then penetrate through the plastic film 16 into the bottom wood board 22 of the packing case 21. At the same time the downwardly projecting fastening teeth 13 will penetrate through the holder 17 of the anti-slip device 10 and into the floor 19, so that the packing case 21 is secured against slipping.

Figure 4:
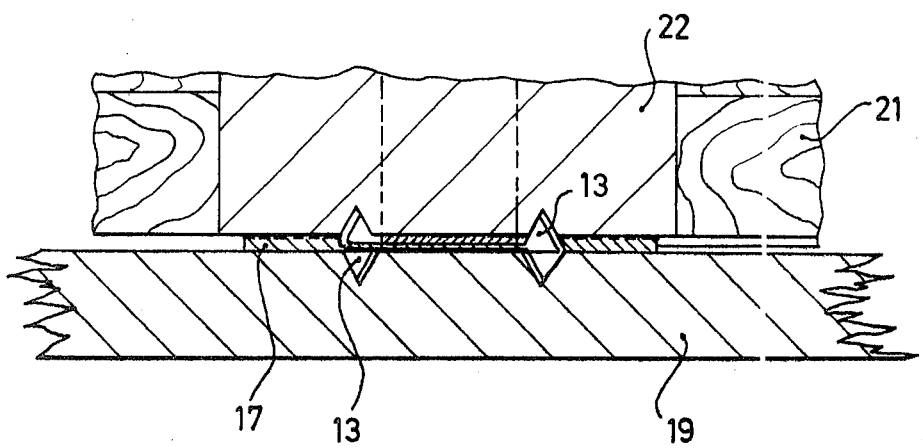
FIG. 4 is a representation on a larger scale of the packing case secured with the anti-slip device of FIG. 3, as seen in the direction of the section line 4—4 of FIG. 3.

This situation is represented in somewhat simplified fashion in FIG. 4.

Since the holder 17 is brightly colored, the anti-slip devices 10 are very easy to locate later on and can easily be removed, if desired, from the parcels.

The invention therefore offers a simple and extraordinarily valuable anti-slip device in which all danger of injury or damage is forestalled. Furthermore, all danger of damage to strapping made of plastic or to other objects if eliminated. Lastly, the direct stacking of parcels alongside one another can be performed without interefence from projecting handles, since the handles, being made of cardboard or the like, can be easily bent aside.

I claim:

1. Anti-slip device for the transportation or storage of parcels packed on wood or consisting of wood, such as cases or beams or the like, which are surrounded by at least one strap, comprising a securing plate of metal, provided in the marginal area of its top and bottom with fastening teeth projecting substantially vertically from the plane of the plate, a plain edge without fastening teeth being provided at least at two oppositely lying marginal sections of the top and bottom of said plate, the width of said sections being at least equal to the width of the strap, and the securing plate being fastened by means of a covering film of plastic to an end section of a strap-like holder of flexible material whose length is substantially greater than the length of the securing plate for the formation of a handle, whereby the anti-slip device is inserted between the parcels and a supporting surface.

2. Anti-slip device of claim 1, wherein the securing plate is of rectangular shape, the fastening teeth being disposed at the longitudinal margins, and the narrow transverse edges being without fastening teeth.

3. Anti-slip device of claim 1, wherein the fastening teeth are of triangular shape and are alternately bent at substantially right angles upwardly and downwardly from the plane of the securing plate.

4. Anti-slip device of claim 1, wherein the flexible holder consists of cardboard.

5. Anti-slip device of claim 1, wherein the flexible holder is colored.

6. Anti-slip device of claim 1, wherein the covering film is welded onto the holder and closely envelops the securing plate.

* * * * *